H. HILDENBRAND.
TAPPING DEVICE.
APPLICATION FILED JAN. 29, 1908.
915,961.
Patented Mar. 23, 1909.
Fig. 1.
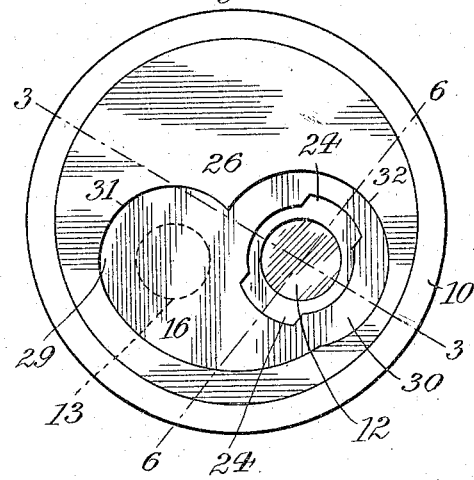
Fig. 2.
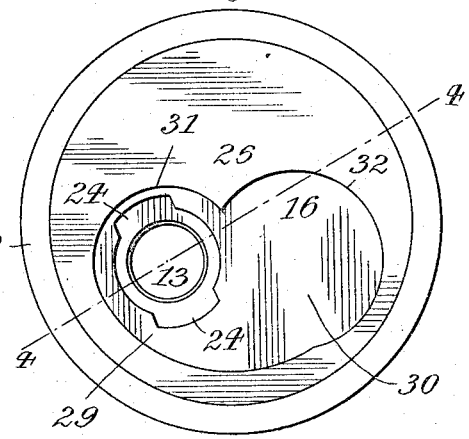
Fig. 3.
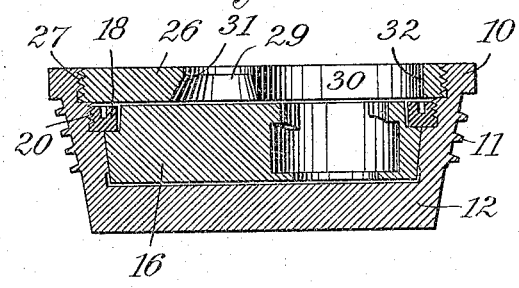
Fig. 4.
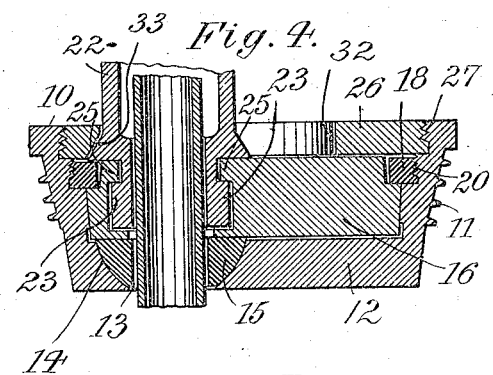
Fig. 5.
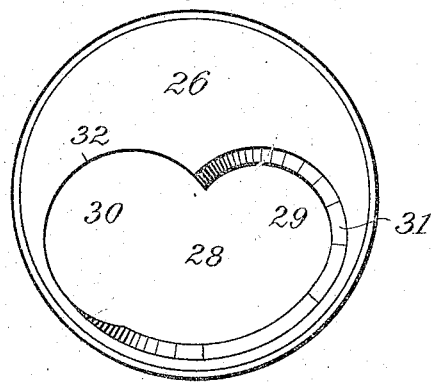
Fig. 7.
Fig. 6.
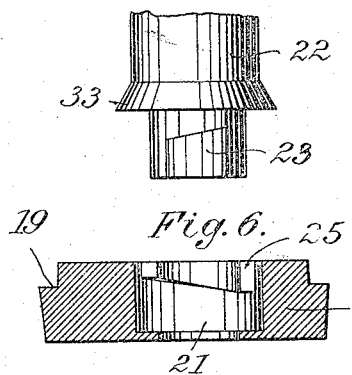
Witnesses:
Arthur E. Zumpe.
W. R. Schulz
Inventor
Henry Hildenbrand
By his Attorney

UNITED STATES PATENT OFFICE.

HENRY HILDENBRAND, OF NEW YORK, N. Y.

TAPPING DEVICE.

No. 915,961.

Specification of Letters Patent.

Patented March 23, 1909.

Application filed January 29, 1908. Serial No. 413,175.

*To all whom it may concern:*

Be it known that I, HENRY HILDENBRAND, a citizen of Germany, residing at New York city, Bronx, county and State of New York, have invented new and useful Improvements in Tapping Devices, of which the following is a specification This invention relates to a metal tapping device for barrels, which constitutes a fixture thereof, prevents leakage, and closes the barrel automatically by the removal of the spigot to exclude dirt from the empty barrels.

In the accompanying drawing: Figure 1 is a top view of my improved tapping device, showing it closed; Fig. 2 a similar view, showing it open; Fig. 3 a section on line 3—3, Fig. 1; Fig. 4 a section on line 4—4, Fig. 2, showing the tap in position; Fig. 5 a bottom view of the face plate; Fig. 6 a cross section of the rotary plug on line 6—6, Fig. 1, and Fig. 7 a detail of the end of the spigot which engages said plug.

A cup-shaped metallic bushing 10, adapted to be fitted into a bung-hole, has an exterior thread 11 for permanent engagement with the barrel. The base plate 12 of bushing 10 is provided with an eccentric tap-hole 13, which is surrounded by a cup-shaped or approximately semi-spherical seat 14 formed within plate 12. This seat accommodates a perforated metallic packing ring 15, the lower semi-ball-shaped face of which snugly fits seat 14, so that while the packing is free to be rocked, a liquid-tight bearing will always be formed around it. The upper face of packing 15 is flat and the packing is of such a height, or it is so seated, that it projects to a slight extent above the top of plate 12, (Fig. 4).

Within bushing 10 is inclosed a rotatable disk or plug 16 which bears upon packing 15, and holds it to its seat. Plug 16 is slightly tapered to engage a correspondingly tapered wall of bushing 10, formed directly above plate 12. A threaded ring 18 accommodated by the rabbeted edge 19 of plug 16 and engaging a thread 20 of bushing 10, holds the plug rotatable to the latter. Plug 16 has an eccentric tap-hole 21 with which the lower end of a suitable spigot 22 may be interlocked. As shown, spigot 22 has a pair of diametrically placed beveled lugs 23 adapted to enter a pair of corresponding recesses 24 of plug 16, and to be projected beneath a pair of opposed beveled lugs 25 of said plug. Thus, by passing lugs 23 into recesses 24 and giving the tap a quarter turn, lugs 23 are brought into engagement with lugs 25 and the tap is securely locked to the plug.

Above plug 16 there is fitted into the bushing, a face plate 26 having a threaded edge which engages a corresponding thread 27 of bushing 10. This face plate is provided with a large opening 28 having a pair of communicating lobular sections 29, 30. Of these, section 29 has an undercut edge 31, and is centered above tap-hole 13. Section 30 is centered above an imperforate section of base plate 12 and has a straight edge 32.

The operation is as follows: When the barrel is closed, plug 16 is so positioned that its tap-hole 21 is out of alinement with tap-hole 13 of plate 12, but is centered within lobe 30. To tap the barrel, spigot 22 is thrust into opening 21 and given an axial quarter turn, as above described, to interlock it with plug 16. The spigot is then pushed sidewise, so as to move it from the center of lobe 30 to the center of lobe 29, and thus carry it opposite to tap-hole 13. As the plug is interlocked with the spigot, it will partake in the movement of the latter, and will thus be so rotated as to bring its opening 21 also opposite opening 13, and thereby open the tap. When the spigot has thus become centered in lobe 29, a flange 33 on the former will become interlocked with the undercut edge 31 of plate 26, so that the spigot cannot possibly be withdrawn as long as the tap is open. When the barrel is empty, the spigot is shifted from center of lobe 29, to center of lobe 30, and thereby so moves plug 16 that its opening 21 is brought out of register with opening 13, and the tap is thereby closed. When the spigot has become centered in lobe 30, it can be readily disconnected from plug 16 by a quarter axial turn, and may then be withdrawn from the tapping device. During all positions of plug 16, and while the same is in motion, it will so press upon packing 15, that the latter always closes tightly against its seat. Thus, in case the plug is not accurately seated, or does not move quite true, it will slightly rock the packing, so that a tight joint is always maintained between the plug and the bushing.

It will be seen that in my improved tapping device the tap is readily opened by a sideways movement of the spigot; that the latter becomes interlocked with the bung as long as the tap is open, so that untimely withdrawal of the spigot is prevented; that the barrel is automatically closed by the same movement which starts the withdrawal of the spigot, and finally that a tight packing of the tap-hole is insured.

I claim:

1. A device of the character described, comprising an eccentrically apertured bushing, an eccentrically apertured plug rotatable therein, a spigot adapted to engage the plug, and means structurally independent of the plug for locking the spigot against withdrawal when the plug and bushing apertures are brought into alinement, substantially as specified.

2. In a device of the character described, a bushing having a perforated base, a perforated plug rotatable above said base, a perforated face plate above the plug, and means for interlocking said plug and face plate with a spigot, substantially as specified.

3. In a device of the character described, a bushing having a perforated base, a perforated plug rotatable above said base, and a face plate above the plug, said face plate having an undercut opening alined with the base-perforation, substantially as specified.

4. In a device of the character described, a bushing having a perforated base, a perforated plug above said base, and a face plate above the plug, said face plate having an opening composed of connected lobular sections, one of which has an undercut edge, substantially as specified.

5. In a device of the character described, a bushing having a perforated base, a perforated plug above the base, a packing intermediate base and plug, a perforated face plate above the plug, and means for interlocking said plug and face plate with a spigot, substantially as specified.

6. In a device of the character described, a bushing having a perforated base, a ball-seated perforated packing projecting upwardly therefrom, a rotatable perforated plug adapted to engage the packing, a perforated face plate above the plug, and means for interlocking said plug and face plate with a spigot, substantially as specified.

7. A device of the character described, comprising a bushing having a base, and an eccentric cup-shaped tap hole in said base, a perforated semi-ball-shaped ring engaging the tap hole and projecting above the base, and an eccentrically perforated plug rotatably seated in the bushing and engaging the ring, substantially as specified.

Signed by me at New York city, Manhattan, N. Y., this 28th day of January, 1908.

HENRY HILDENBRAND.

Witnesses:
FRANK V. BRIESEN,
AUGUST MINER.